United States Patent
Kheder et al.

[11] Patent Number: 5,948,218
[45] Date of Patent: Sep. 7, 1999

[54] CORROSION PROTECTION SYSTEM

[75] Inventors: Joseph Kheder, Chula Vista, Calif.; Johannes Maria Cordia, Pellenberg, Belgium

[73] Assignee: N.V. Raychem S.A., Kessel-Lo, Belgium

[21] Appl. No.: 08/727,481

[22] PCT Filed: Apr. 12, 1995

[86] PCT No.: PCT/GB95/00835

§ 371 Date: Jan. 29, 1997

§ 102(e) Date: Jan. 29, 1997

[87] PCT Pub. No.: WO95/29275

PCT Pub. Date: Nov. 2, 1995

[30] Foreign Application Priority Data

Apr. 21, 1994 [GB] United Kingdom .................. 9407943
Jun. 13, 1994 [GB] United Kingdom .................. 9411787

[51] Int. Cl.⁶ .................................................. C23F 13/00
[52] U.S. Cl. ......................... 204/196; 204/282; 204/291; 204/294
[58] Field of Search ................................. 204/196, 197; 205/724, 730–740

[56] References Cited

U.S. PATENT DOCUMENTS

| | | | |
|---|---|---|---|
| 2,525,665 | 10/1950 | Glesner et al. | 204/197 |
| 3,012,958 | 12/1961 | Vixler | 204/197 |
| 3,022,242 | 2/1962 | Anderson | 204/196 |
| 3,458,643 | 7/1969 | Dorr | 174/6 |
| 3,527,685 | 9/1970 | Anderson | 204/196 |
| 3,623,968 | 11/1971 | Bohne | 204/197 |
| 3,629,091 | 12/1971 | George | 204/197 |
| 3,725,669 | 4/1973 | Tatum | 307/95 |
| 4,133,737 | 1/1979 | Trimble | 204/197 |
| 4,267,029 | 5/1981 | Massarsky | 204/196 |
| 4,292,149 | 9/1981 | Warne | 204/196 |
| 4,487,676 | 12/1984 | Parker et al. | 204/196 |
| 4,502,929 | 3/1985 | Stewart et al. | 204/147 |
| 4,504,375 | 3/1985 | Griffioen | 204/196 |
| 4,526,666 | 7/1985 | Bianchi et al. | 204/196 |
| 4,544,464 | 10/1985 | Bianchi et al. | 204/147 |
| 4,957,612 | 9/1990 | Stewart et al. | 204/196 |
| 4,966,675 | 10/1990 | Steininger | 204/290 |
| 4,990,231 | 2/1991 | Stewart et al. | 205/737 |
| 5,512,153 | 4/1996 | Day et al. | 204/196 |

OTHER PUBLICATIONS

"External Pipeline Rehabilitation", R. John, *Pipeline magazine*, Oct. 1990.
Search Report for British Application No. GB 9407943.1, dated Jun. 8, 1994..
Search Report for International Application No. PCT/GB95/00835, mailed Aug. 8, 1995.

*Primary Examiner*—T. Tung
*Attorney, Agent, or Firm*—Marguerite E. Gerstner; Timothy H.P. Richardson; Herbert G. Burkard

[57] ABSTRACT

An elongate electrode, usually an anode, is provided, suitable for use in an impressed current corrosion protection system. The electrode comprises a central elongate core, usually a metal such as copper, an optional conductive polymeric composition surrounding the metal core and having a higher electrical resistivity than the core, but being in electrical contact with the core, a flexible jacket, for example, a fabric braid containing within it particulate coke, and tensioning wraps positioned around the flexible jacket. The purpose of the tensioning wraps is to compact the coke particles relative to their compaction in the absence of the tensioning wraps.

20 Claims, 1 Drawing Sheet

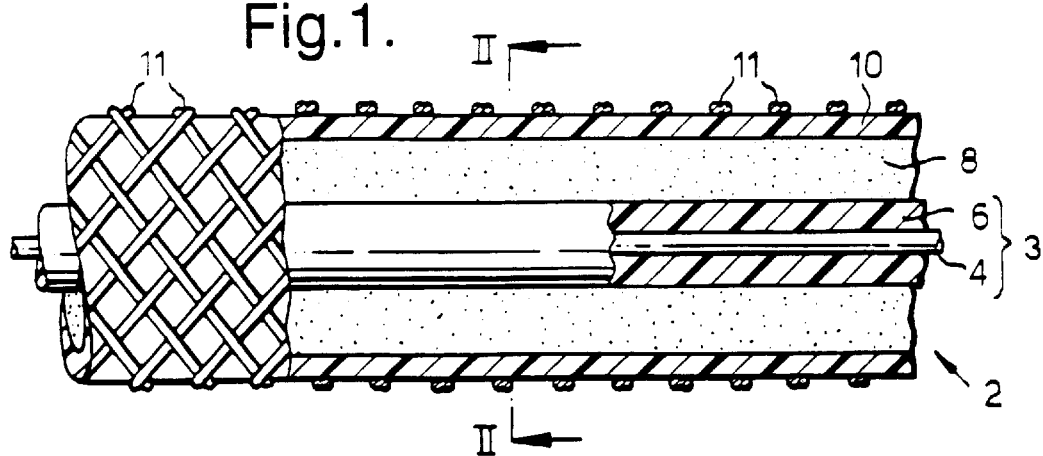
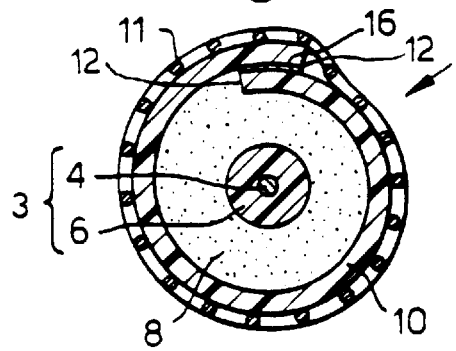
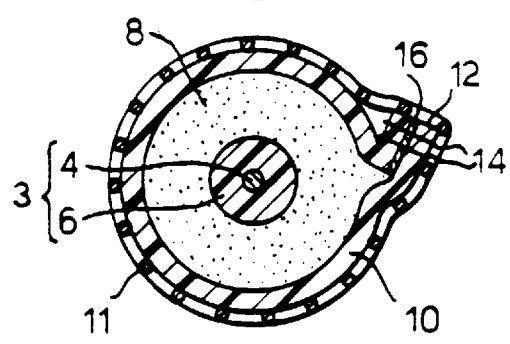
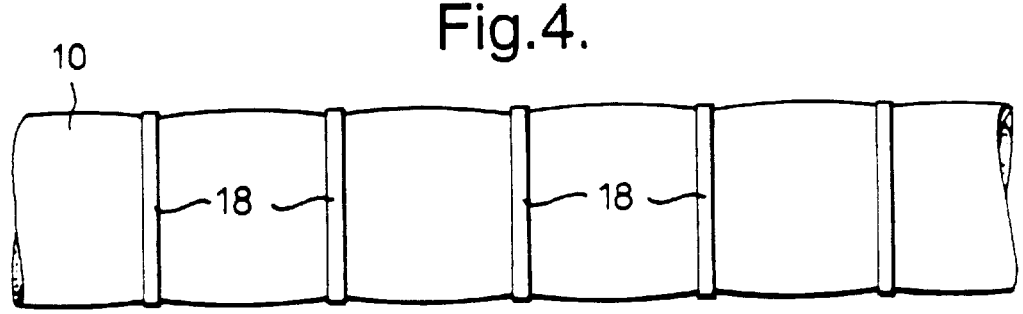
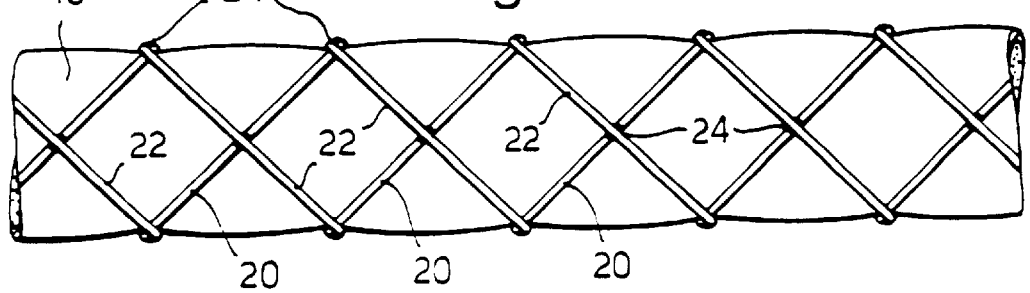

CORROSION PROTECTION SYSTEM

BACKGROUND OF THE INVENTION

1. Field of the Invention

This invention relates to a long-line electrode, preferably a long line anode, for an impressed current corrosion protection system, for example for the corrosion protection of buried pipelines or tanks or other substrates.

2. Introduction to the Invention

It is well known to provide impressed current corrosion protection systems in which an electrically conductive substrate is protected from corrosion by establishing a potential difference between the substrate and a spaced-apart electrode. The substrate and the electrode are connected to each other through a power supply of constant sign (DC or rectified AC) and the circuit is completed when electrolyte is present in the space between the substrate and the electrode. In most such impressed current systems, the substrate is the cathode (i.e. receives electrons). However, with substrates which can be passivated, e.g. Ni, Fe, Cr and Ti and their alloys, it is sometimes also possible to use impressed current systems in which the substrate is the anode. In both cathodic and anodic systems, the substrate is often provided with a protective insulating coating; in this case the impressed current flows only through accidentally exposed portions of the substrate. If the system is to have an adequate life, the electrode must not itself be corroded at a rate which necessitates its replacement; this is in contrast to the "sacrificial anodes" which are used in galvanic protection systems. The electrode must also have a surface which is not rendered ineffective by the current passing through it or by the electrochemical reactions taking place at its surface, such as the evolution of chlorine gas.

The electrode and the power supply must be such that the current density at all points on the substrate is high enough to prevent corrosion but not so high as to cause problems such as damage to the substrate (e.g. embrittlement) or disbonding of a protective coating on it. The power consumption of the system depends inter alia on the distance between the various parts of the substrate and electrode. In view of these factors, the theoretically best type of electrode is one which can be positioned so that it is relatively close to all points on the substrate. To this end it may have a shape corresponding generally to the shape of the substrate. Such an electrode is referred to herein as a "distributed electrode".

European Patent Publication No. 0067679 describes a distributed electrode, usually a distributed anode comprising a metal, e.g. copper, conductive core and a conductive polymeric jacket. European Patent Publication No. 0067679 describes a distributed electrode whose electrically active outer surface is provided by an element which is composed of a conductive polymer which is at least 500 $\mu$m, preferably at least 1000 $\mu$m, thick. The term "conductive polymer" is used herein to denote a composition which comprises a polymer component, and dispersed in a polymer component, a particulate conductive filler which has good resistance to corrosion, especially carbon black or graphite. In particular the electrode comprises a low resistance core electrically surrounded by a conductive polymer composition, wherein the anode is an electrode spaced apart from the substrate, the electrode being in the form of an elongate flexible strip which can be bent through an angle of 90° over a 10 cm radius, the electrode comprising (1) a continuous, elongate core which is composed of a material having a resistivity at 23° C. of less than $5 \times 10^{-4}$ ohm.cm and a resistance at 23° C. of less than 0.03 ohm/meter; and (2) an element which
  (i) is composed of a conductive polymer composition which has an elongation of at least 10%, according to ASTM D1708,
  (ii) provides at least a part of the electrochemically active outer surface of the electrode, and
  (iii) is in the form of a coating which electrically surrounds the core and is in electrical contact with the core, and which is at least 500 $\mu$m thick.

The entire disclosure of European Patent Publication No. 0067679 is incorporated herein by reference.

Where a conductive polymer based anode as described in European Patent Publication No. 0067679 is used alone for cathodic protection, after many years, in extreme environments, some of the carbon of the conductive polymer jacket may be consumed as part of the corrosion protection electrochemical process. Therefore it is also known, for corrosion protection of soil-buried substrates, to use a coke breeze back-fill around the anode. Thus, for example, for protection of a buried pipeline, a trench may be dug in the soil near to the pipeline, and as the elongate conductive polymer based anode is payed off into the trench, it is surrounded by a layer (e.g. about 50 mm thick) of coke breeze, before the top soil is replaced. This process is described for example in "External Pipeline Rehabilitation" by R. John, Pipeline Magazine, Oct. 1990. The coke breeze provides a greater overall anode surface, and also decreases the overall resistance of the system.

It is also known, to provide an elongate anode corrosion protection system in which coke breeze is provided, around the elongate core and conductive polymeric layer, pre-packaged in a nylon fabric jacket. The nylon jacket serves in this case as a delivery tool for the coke. It is furthermore known that an enhanced performance elongate anode may be provided by not only providing coke, or other carbon rich environment, around the elongate conductive core and the conductive polymeric layer, but by particular selection of the jacketing material containing the carbon rich material. It is known to be preferred to select the material for the jacket so that is resistant to environmental attack, especially acid and chlorine attack. The result of this jacket material selection is that the carbon rich material remains in the close vicinity of the elongate conductive core and conductive polymeric layer surrounding the elongate core, during use of the anode. This is described in International Patent Publication No. WO 93/02311, counterpart of U.S. Pat. No. 4,412,153, the entire disclosure of which is incorporated herein by reference.

SUMMARY OF THE INVENTION

We have now discovered that the performance of the electrode, usually an anode, described in WO 93/02311, or the known electrode (usually an anode) comprising coke breeze delivered in a nylon jacket, or the performance of any electrically conductive elongate core which is surrounded by an electrically-conductive consumable filler contained within a fabric or other flexible jacket, can be enhanced by positioning around the jacket tensioning wraps applied so as better to compact the filler within the jacket.

Accordingly the present invention provides a corrosion protection system comprising an elongate electrode comprising (1) an electrically conductive elongate core,
(2) a flexible jacket surrounding the elongate core, and containing, between it and the core, a carbon rich material in particulate form, preferably coke, and
(3) tensioning wraps tensioned around the flexible jacket such that the compaction of the particles of carbon rich material is increased relative to the compaction in the absence of said wraps.

DETAILED DESCRIPTION OF THE INVENTION

Preferably the elongate core comprises an inner core, which is itself conductive and which is surrounded by another conductive layer, preferably a conductive polymeric layer. The conductive polymeric layer preferably has a higher electrical resistivity than the inner core, and is in electrical contact with the inner core.

Preferably the inner core is composed of a material having a resistivity at 23° C. of less than $5 \times 10^{-4}$ ohm.cm and a resistance at 23° C. of less than 0.03 ohm/meter. The inner core is preferably a metal. The inner core may comprise for example copper.

The inner core is preferably surrounded by a conductive polymeric composition, but the present invention also encompasses a corrosion protection system in which the core has no surrounding layer and is in direct contact with the carbon rich material, and systems in which the core is surrounded by layers of other conductive materials. The layers of other conductive materials are preferably less conductive than the inner core. One example of another material that may be used to surround the inner core is a metal or metal oxide, or a combination thereof.

For the avoidance of doubt we make it clear that the term conductive polymer, being a composition comprising a polymer component and dispersed therein a particulate conductive filler, includes those compositions in which the polymer component is a thermoplastic, a rubber or a thermoplastic rubber, e.g. butyl or nitrile rubber, olefin homopolymers and copolymers and other materials e.g. as set out on page 4, lines 20–25, of European Patent Publication No. 0067679B.

Relative compaction of the carbon-rich material in the jacket is measured, according to the invention by using a piece of apparatus known as a "texture analyzer". The apparatus consists of a probe assembly fixed to a motor driven, bi-directional load cell. The probe is driven vertically into the sample at a pre-set speed (in our case 2 mm/sec), and to a pre-set depth (in our case 1 mm). The resistance of the device to compaction is measured as a weight (in grams) needed to push the probe into the sample. The probe used is a stainless steel ball, diameter 6.35 mm. The higher the weight recorded the higher the resistance to penetration, i.e. the better the compaction of the carbon rich material in the jacket.

The carbon rich material in particulate form is preferably in powder form.

The jacket is said to be flexible. By this we mean that it can be deformed into a different configuration by movement of the carbon rich material within it, and/or by the action of the tensioning wraps positioned around it. The jacket is most preferably polymeric.

The tensioning wraps may take any suitable configuration. Particularly preferred is for the tensioning wraps to be in the form of a braid. Other possible constructions include circumferentially wrapped ties, or helically wrapped ties. In the case of helically wrapped ties, two ties wrapped in the opposite sense may be used. These ties may be permanently secured to each other at the, or some of the, cross over points, so that the ties do not unwind if damaged at one point along the anode.

The tensioning wraps are applied with sufficient tension to compress and compact the particulate carbon rich material within the jacket. The wraps are preferably applied so as to generate a radially inwardly directed force to achieve the compaction. In the case of a braid the radial force may, for example, be generated by stretching the braid longitudinally, which has the effect of reducing the diameter of the braid. The tensioning wraps could also be made of a heat shrinkable material. Such materials are well known.

The flexible jacket directly surrounding the particulate carbon rich material may comprise a fabric, or a continuum material, for example a film or sheet. The material must of course be ion permeable to allow passage of ions in the electrochemical process which provides the corrosion protection. In one embodiment the jacket material may comprise apertures of a few microns, tens of microns or even up to 0.5 cm or more. The apertures must however be sufficiently small to retain substantially all the carbon rich material within the jacket adjacent the electrode. This will depend on the nature of the carbon rich material used. Similarly the tensioning wraps must be appropriately spaced relative to each other to allow passage of ions therethrough, while maintaining an adequately inwardly directed force over the surface of the jacket surrounding the electrode so as to provide the increased compaction of the carbon rich material. The tensioning wraps do not retain the coke however; their function is to maintain compaction. Retention of the coke is achieved by the jacket.

The use of tensioning wraps in this way advantageously provides much improved compaction of the carbon rich material. Using the test set out above, the force necessary to penetrate the compacted particles within the flexible jacket is preferably at least 1.2 times, more preferably 2, 3 or even 4 times that necessary to cause the same penetration in the absence of the tensioning wraps. Tests were carried out to ascertain the degree of compaction using the texture analyzer described above, calibrated such that the maximum weight applicable was 1000 g. Tests on non-overbraided electrode samples showed that weights in the range about 150–800 g were needed to achieve the pre-set penetration of 1 mm, while with overbraided samples weights of at least 900 g were required to achieve the 1 mm penetration and frequently the maximum weight of 1000 g was insufficient to achieve the 1 mm penetration. These high weight values were achieved consistently with the overbraided samples. In contrast non-overbraided samples sometimes showed relatively good resistance to penetration (weight of up to 800 g required to achieve 1 mm penetration), but frequently showed very poor resistance to penetration (weights as low as 150 g required to achieve 1 mm penetration). In other words the overbraiding provides a means of consistently achieving good compaction of the carbon rich material in the jacket, and correspondingly high resistance to penetration.

Compaction of the carbon rich material around the core is advantageous for a number of reasons, several of which are electrochemical. Without in any way limiting the invention, it is believed that one electrochemical advantage of enhanced compaction is that it may lower the radial resistance of the mass of carbon rich material and/or may reduce the contact resistance between the core and the carbon rich material. It is also thought that with such compaction most, if not substantially all, the electrochemical reactions will take place at the outer boundary of the compacted carbon rich material, rather than at the outer surface of the core. Therefore, in the electrochemical reactions providing the corrosion protection, the particulate carbon rich material will be consumed in preference to any carbon in the core, e.g. any carbon in the conductive polymeric material in case of a core comprising an inner core surrounded by a conductive polymeric layer.

It is desirable for the core of the electrode to be substantially centered within the surrounding carbon rich material and outer jacket of the electrode. This is advantageous since, if the core is off-center, relatively shorter ionic paths will exist through the carbon rich material to the core. These shorter paths will act as "short circuits" where the electrochemical reactions will concentrate. This short-circuiting may disadvantageously lead to attack, at the short circuit points, of the core, e.g of the conductive polymeric material in the case of an electrode comprising a conductive polymeric material surrounding an inner core. This may shorten the life of the electrode. Preferably the difference between the maximum and minimum distance between the jacket and the core is at most 25%, more preferably at most 12%, or even 10% of the said minimum distance, i.e. the distance between jacket and the core differs by at most 25%, more preferably at most 12% or even 10% along the length of the electrode. As an example in one embodiment according to the invention the minimum distance between the jacket and the core is about 13 mm, and this varies by plus or minus 2 mm, preferably by plus or minus 1 mm along the length of the electrode.

Another important advantage of the compaction achieved by the use of tensioning wraps, is that provided the core is substantially centered within the jacket material during manufacturing, then this centering is maintained, by the compact carbon rich material around the core, during subsequent handling (e.g spooling, storage, transport, and installation) of the electrode.

Another measure which relates to the centring of the core in the jacket is the difference in the diameter of the filled jacket measured in mutually perpendicular directions. Preferably the difference in diameters at any measuring point along the electrode is at most 10%, preferably at most 7%, especially preferably at most 5% of the minimum diameter at the measuring point. In other words, the diameters measured in mutually perpendicular directions at any point along the length of the electrode, differ by at most 10%.

The use of tensioning wraps according to the invention is particularly desirable in situations where it is otherwise difficult to retain compaction of the carbon-rich material and/or good centering of the core in the jacket after the initial manufacture of the electrode. One example where this is so is where the material used for the flexible jacket surrounding the carbon rich material is itself relatively elastic. Another example is where the jacket is a wraparound jacket which is closed and made into a tubular configuration by bonding or mechanically securing overlapping regions of the jacket and the closure tends to move off-center the core within the jacket. The overlapping regions may be arranged, for example in a lap bond, or in an upstanding- or inwardly directed- fin seam, both of which configurations are described in International Patent Publication No. WO 93/02311, and both of which may tend, in the absence of tensioning wraps, to detract from a well-centered core within the outer flexible jacket. Another factor which may detract from good centering and compaction of the carbon rich material within the outer jacket is handling of the electrode prior to, or during its on-site installation. The elongate electrode is frequently many meters long, and is conveniently spooled onto drums for storage and delivery. The actual spooling onto drums, storage and transport of the drums, and the subsequent handling of the electrode during installation may all affect the compaction and/or centering of the core in the jacket in the absence of the tensioning wraps of the invention.

The preferred value ranges mentioned above for (i) the compaction (measured as resistance to a penetrating weight), (ii) the difference in the diameter of the jacket in mutually perpendicular directions and (iii) the difference between the maximum and minimum distance between the jacket and the core, preferably also apply after the following procedures:

(a) spooling the electrode onto a drum with a diameter 8 times that of the electrode, storing the electrode on the drum for 12 hours, then unspooling for testing; and (b) vibrating a length of electrode wrapped on a spool (diameter as in (a)) on a vibration bank at 1 cm amplitude at 4 Hz.

The above procedures (a) and (b) are designed to simulate respectively the storage conditions and the transport conditions the electrode might expect to encounter.

A substantially centered elongate element that is capable of maintaining said centering is believed to be novel. Therefore another aspect of the invention provides a corrosion protection system comprising an elongate electrode comprising (1) a continuous electrically conductive elongate core, (2) a flexible jacket surrounding the core and containing, between it and the core, a carbon rich material in particulate form, preferably coke, and (3) tensioning wraps tensioned around the flexible jacket, whereby the core is substantially centered within the jacket, and the said substantial centering is maintained when the elongate element is subjected to either or both of the following tests:

(a) spooling onto a drum with a diameter 8 times that of the elongate element, storing the elongate element on the drum for 12 hours, then unspooling; and (b) vibrating a length of elongate element wrapped on a spool (diameter as in (a)) on a vibration bank at 1 cm amplitude at 4 Hz.

As with the first aspect of the invention, it is preferred that the core comprises an inner core and a conductive polymer composition which electrically surrounds the inner core, has a higher electrical resistivity than the inner core, and is in electrical contact with the inner core. However embodiments in which the inner core is uncovered, or is covered with a metal, metal oxide or combination thereof are also envisaged.

The maintenance of compaction of the carbon rich material around the core is particularly important up until the electrode is installed. Once installed (typically in the ground) the surrounding soil will also tend to retain the compaction.

The use of tensioning wraps surrounding the flexible jacket also has an additional advantage that, depending on the material used it may enhance the abrasion resistance of the electrode. Abrasion resistance is a particularly important parameter where the electrode is to be used in soil where abrasive stones may rub against the electrode.

As mentioned above the tensioning wraps used in the invention are preferably in the form of a braid. Preferably the braid provides at least 10%, preferably at least 20%, more preferably at least 25%, and for some applications at least 40% coverage (i.e. surface area coverage) of the underlying flexible jacket. A braid may be considered as a series of adjacent diamond shaped apertures, and in one preferred embodiment a braid is used with strands sufficiently finely interleaved to produce a braid in which 20 to 31, preferably about 26 diamonds intersect a length of 25 cm. With appropriate selection of fibers for the braid this may achieve a braid coverage of about 25%. In another preferred embodiment a braid is used with strands sufficiently finely interleaved to produce a braid in which 50 to 70, preferably about 60 diamonds intersect a length of 25 cm. With an appropriate selection of fibers for the braid this may achieve a braid coverage of about 43%. Preferably the dimension across any aperture in the braid is in the range 0.1 to 1.5 cm, especially in the range 0.5 to 1.5 cm.

Preferably the fibers or filaments used in the braid have a diameter of 0.20 to 0.50 mm. Fibers with a relatively large diameter, e.g. 0.38 to 0.50 mm, may provide better tension on the compacted carbon rich material and give more control during the braiding process.

Preferred materials for use for the tensioning wraps are materials with good mechanical strength, and relatively good resistance to acid and chlorine attack (a factor important in the selection of material for the jacket as set out below). Preferred materials are polymers, but any material capable of providing sufficient tension for compaction could be used. A particularly preferred material is polyester, especially Diolene as supplied by Enka.

Fibers in the form of monofilaments or bundles are preferably used for the tensioning wraps. Where bundles are used the fibers of the bundle may be twisted, but are preferably untwisted in side-by-side arrangement.

The flexible jacket containing the carbon rich material may be made in a circular construction or wraparound construction. If a fabric, a circular construction may be achieved by circular weaving, knitting, braiding, or may be based on a non-woven fibers. In other embodiments the fabric jacket is wraparound and longitudinal edges of the fabric are joined to each other. The edges of a wraparound design may, for example, be abutted and bonded to each other in an upstanding fin arrangement (which may point inwardly or outwardly of the jacket). Alternatively the longitudinal edges may simply be overlapped and bonded to each other. Bonding may involve mechanical means such as stitching (one or more seams may be used), hooks and eyes e.g. Velcro strip, stapling, riveting, using clips, or clamps, or bonding may involve the use of adhesives, or bonding may be for example by welding, e.g. ultrasonic welding, air welding, hot wedge welding, radio frequency welding, inductive heating, or solvent welding. Where stitching is used, there are typically 3–10 stitches/inch. Stitch types may be, for example double thread chain stitch, lock stitch or, 3-thread overlock. Suitable sewing threads include PTFE and Dralon T (Bayer). Other suitable bonding techniques would be apparent to the man skilled in the art. Combinations of joining techniques may also be used, e.g. adhesive bonding combined with a mechanical means. The joining technique selected depends on the nature of the jacket material selected. Where an adhesive is used, alone or in combination with another bonding technique, examples of suitable adhesives that may be used include, polyvinylidene dichloride, and its copolymers (e.g. Saran from Dow Chemical), polyvinyl chloride, and its copolymers, fluoropolymer resins, acrylic resins, and acrylic acid or methacrylic acid copolymers (e.g. Primacor and Nucrel from Dow Chemical and Du Pont respectively).

We have found that the use of tensioning wraps according to the invention also acts to retain the wrapped configuration of the wraparound jacket, so as to retain the carbon rich material within the jacket. In the absence of the tensioning wraps the seam between the longitudinal edges of a wraparound jacket is a region of potential weakness, and the use of tensioning wraps mitigates against this weakness. (Special selection of mechanical and/or chemical bonding means may also be desirable to enhance the bond at the longitudinal seam to ensure the wraparound structure is retained). The improvement achieved by the use of tensioning wraps is particularly evident where an adhesive seambond is used, since at temperatures greater than 70° C., or even greater than 80° C. or 100° C., the adhesive bond may (depending on the selection of adhesive) fail. The use of tensioning wraps according to the invention therefore broadens the range of closures that may be used for a wraparound jacket, by acting to retain the wrapped configuration of the wraparound jacket.

As mentioned above, acid and chlorine resistance are particularly preferred features for the flexible material of the jacket. These features are set out in International Patent Publication No. WO 93/02311. According to that patent the material of the flexible jacket is polymeric and:

(i) resistant to acid to the extent that if a section of the jacket material is immersed in hydrochloric acid of at least 0.01N concentration at 60° C. for 90 days and then subjected to a tensile test, and a load versus elongation curve plotted from the tensile test, then (a) the maximum load recorded during that test is at least 60%, preferably 70%, more preferably 80% of the maximum load recorded for a load versus elongation curve for a similar section of the same material which has not been subjected to immersion in the said hydrochloric acid, and (b) the elongation of the said section at the maximum load is at least 60%, preferably 70%, more preferably 80% of the elongation at the maximum load of a similar section which has not been subjected to immersion in the said hydrochloric acid; and (ii) resistant to chlorine to the extent that if a section of the jacket material is immersed in acidified sodium hypochlorite for 90 days, during which time sufficient acid is added to the hypochlorite solution periodically such that chlorine is continually present (i.e. chemical chlorine), and then the said section subjected to a tensile test, and a load versus elongation curve plotted from the tensile test, then (a) the maximum load recorded during that test is at least 70%, preferably 80%, more preferably 90% of the maximum load recorded for a load versus elongation curve for a similar section of the same material which has not been subjected to immersion in acidified sodium hypochlorite solution, and (b) the elongation of the said section at the maximum load is at least 60%, preferably 70%, more preferably 80% of the elongation at the maximum load of a similar section which has not been subjected to immersion in the acidified sodium hypochlorite solution.

Especially preferred materials for the flexible jacket are polymers, copolymers or blends of polyacrylonitrile, partially or wholly halogenated aliphatic polymers, particularly polyvinylidene chloride or fluoride, polytetrafluoroethylene, poly (ethylene-tetrafluoroethylene), poly (ethylene-chlorotrifluoroethylene), polyvinyl fluoride, polyvinylchloride and polyvinylacetate. Preferred materials based on polyacrylonitriles are Dralon (Bayer), Orlon (Du Pont), Courtelle (Courtaulds), Acrilan (Monsanto), and Dolan (Hoechst). Especially preferred materials are modacrylic polymers, that is a material comprising between 35% and 85% polyacrylonitrile, for example, Teklan (Courtaulds—which comprises 50/50 polyacrylonitrile/ polyvinylidene dichloride), Velicren (Enimont), SEF (Monsanto) and Kaneklon (a vinyl chloride-based composition supplied by Kanegafuchi). Another preferred material is Saran (PVDC copolymer from Dow Chemical). Another possible, though less preferred, material is poly(butylene-terephthalate). This has good chlorine resistance, and the desired acid resistance in environments of about pH2 (or in less acid environments). However its acid resistance in pH environments approaching 0 is less favorable than the materials referred to above.

The carbon rich material surrounding the core may comprise, for example, lamp black or carbon black particles, coke pieces, preferably coke pieces having a particle diameter of the order of 100 to 500 microns, although other larger sizes could be used, natural graphite, carbon powder or short cut fiber in a fibrous mat, pyrolitic graphite, pyrolyzed polyacrylonitrile, or vitreous carbon.

BRIEF DESCRIPTION OF THE DRAWINGS

An embodiment of the present invention will now be described, by way of example, with reference to the accompanying drawings, wherein:

FIG. 1 is a longitudinal part-sectional view of an elongate element according to the invention;

FIG. 2 is a cross-sectional view of the device of FIG. 1;

FIG. 3 is a cross-sectional view of another device according to the invention, and FIGS. 4 and 5 are side views of further devices according to the invention.

DETAILED DESCRIPTION OF THE DRAWINGS

Referring to the drawings, FIGS. 1 and 2 show a device 2 comprising a core 3 comprising an inner core in the form of a copper wire 4 surrounded by a conductive polymeric layer 6. Surrounding layer 6 is coke breeze 8 within a containing layer 10 comprising a weave of a polyacrylonitrile based material. Surrounding the jacket 10 are tensioning wraps in the form of a braid 11 made of monofilaments of polyester sufficiently tightly woven, and tensioned, so as to provide higher compaction of the coke within the jacket 10 compared to the compaction of coke in a jacket without the overbraid 11.

As seen in FIG. 2, jacket 10 is a wraparound jacket and longitudinal edges 12 are bonded to each other by adhesive 16. The overbraid 11 surrounds the overlap, and helps to retain the wraparound configuration in a closed position, especially at elevated temperatures.

FIG. 3 shows an alternative joining arrangement in which the longitudinal edges of the sleeve abut in an upstanding seam directed outwardly of the jacket 10, with two rows of stitches 14 extending along the seam, and an adhesive bond 16 between the seams. Again the overbraid 11 surrounds the seam (which is bent over by the presence of the braid), and helps to retain the wraparound configuration closed.

Instead of a wraparound jacket, a tubular jacket material may be used (not illustrated).

FIG. 4 shows another embodiment in which the flexible jacket 10 surrounding the coke (not visible) is itself compacted by annular ties 18, tensioned about the jacket 10 so as to compact the coke 8 relative to its compaction in the absence of ties 18.

Similarly FIG. 5 shows another embodiment in which the tensioning wraps are provided by two sets of helically wrapped ties 20 and 22, wound in opposite senses to each other. The ties 20 and 22 are bonded to each other at each cross over point 24 so that in the event that part of one of the ties 20, 22 is damaged the entire helix of the tie does not unwind.

What is claimed is:

1. A corrosion protection system comprising an elongate element comprising (1) an electrically conductive elongate core,
   (2) a flexible jacket which (a) comprises a material which is permeable to ions, and (b) surrounds the elongate core and contains, between it and the core, a carbon rich material in particulate form, and
   (3) tensioning wraps tensioned around the flexible jacket and supplying an inwardly directed force over the jacket to compact the carbon rich material such that the compaction of the particles of carbon rich material, as measured by the force required to drive a 6.35 mm diameter stainless steel ball probe of a texture analyzer at 2 mm/second vertically 1 mm into the carbon rich material of the elongate element, is at least 1.2 times that of the compaction in the absence of said wraps, said elongate core being substantially centered within the carbon rich material and the surrounding flexible jacket.

2. A corrosion protection system according to claim 1, wherein the elongate core comprises (a) an inner core, and
   (b) a conductive polymer composition which (i) electrically surrounds the inner core, (ii) has a higher electrical resistivity than the inner core, and (iii) is in electrical contact with the inner core.

3. A corrosion protection system according to claim 2, wherein the inner core is composed of a material having a resistivity at 23° C. of less than $5 \times 10^{-4}$ ohm.cm and a resistance at 23° C. of less than 0.03 ohm/meter.

4. A corrosion protection system according to claim 1, wherein the elongate core comprises (a) an inner core, and
   (b) a metal or metal oxide layer which (i) electrically surrounds the inner core, (ii) has a higher electrical resistivity than the inner core, and (iii) is in electrical contact with the inner core.

5. A corrosion protection system according to claim 1, wherein the tensioning wraps are provided by a braid.

6. A corrosion protection system according to claim 5, wherein the braid provides at least 25% coverage of the flexible jacket.

7. A corrosion protection system according to claim 6, wherein the braid provides at least 40% coverage.

8. A corrosion protection system according to claim 1, wherein the tensioning wraps are provided by annular ties.

9. A corrosion protection system according to claim 1, wherein the tensioning wraps are provided by helically wrapped ties.

10. A corrosion protection system according to claim 9, wherein the tensioning wraps comprise two sets of ties which are wound in opposite sense.

11. A corrosion protection system according to claim 10, wherein the ties are bonded to each other at their overlapping points.

12. A corrosion protection system according to claim 1, wherein a diameter of the element at any point along the elongate element differs by at most 10% from the diameter of the element measured in a perpendicular direction at that point.

13. A corrosion protection system according to claim 1, wherein the distance between the jacket and the core differs by at most 25% along the length of the electrode.

14. A corrosion protection system according to claim 13, wherein the distance differs by at most 10%.

15. A corrosion protection system according to claim 1, wherein (a) the flexible jacket is a wraparound jacket,
   (b) longitudinal edges of the jacket are bonded to each other, and (c) the tensioning wraps surround the jacket, including the overlapped edges.

16. A corrosion protection system according to claim 1, wherein the tensioning wraps comprise polyester.

17. A corrosion protection system according to claim 1, wherein the tensioning wraps comprise monofilaments or bundles.

18. A corrosion protection system according to claim 1, wherein the carbon rich material comprises coke.

19. A corrosion protection system comprising an elongate electrode comprising (1) an electrically conductive elongate core, (2) a flexible jacket which (a) comprises a material which is permeable to ions, and (b) surrounds the core and contains, between it and the core, a carbon rich material in particulate form, and (3) tensioning wraps tensioned around the flexible jacket and supplying an inwardly directed force over the jacket to compact the carbon rich material such that the compaction of the particles of carbon rich material, as measured by the force required to drive a 6.35 mm diameter stainless steel ball probe of a texture analyzer at 2 mm/second vertically 1 mm into the carbon rich material of the elongate element, is at least 1.2 times that of the compaction in the absence of said wraps, whereby the core is substantially centered within the carbon rich material and the surrounding jacket, and the said substantial centering is maintained when the elongate element is subjected to one of the following tests:

(a) spooling onto a drum with a diameter 8 times that of the elongate electrode, storing the elongate electrode on the drum for 12 hours, then unspooling;

(b) vibrating a length of the elongate electrode wrapped on a spool with a diameter 8 times that of the elongate electrode on a vibration bank at 1 cm amplitude at 4 Hz; and (c) both (i) spooling onto a drum with a diameter 8 times that of the elongate electrode, storing the elongate electrode on the drum for 12 hours, then unspooling, and (ii) vibrating a length of the elongate electrode wrapped on a spool with a diameter 8 times that of the elongate electrode on a vibration bank at 1 cm amplitude at 4 Hz.

20. A corrosion protection system according to claim 19, wherein the carbon rich material comprises coke.

\* \* \* \* \*